UNITED STATES PATENT OFFICE.

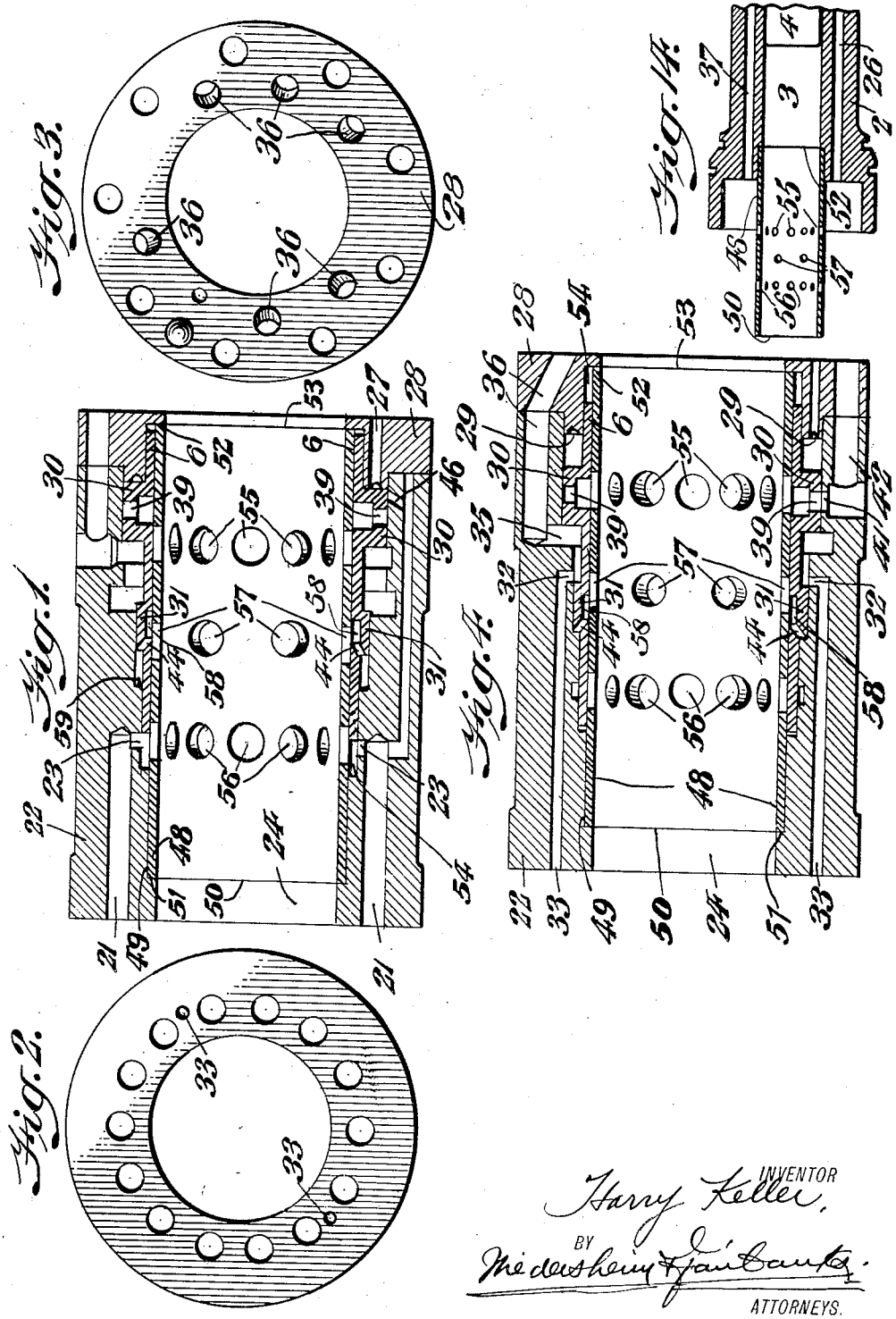

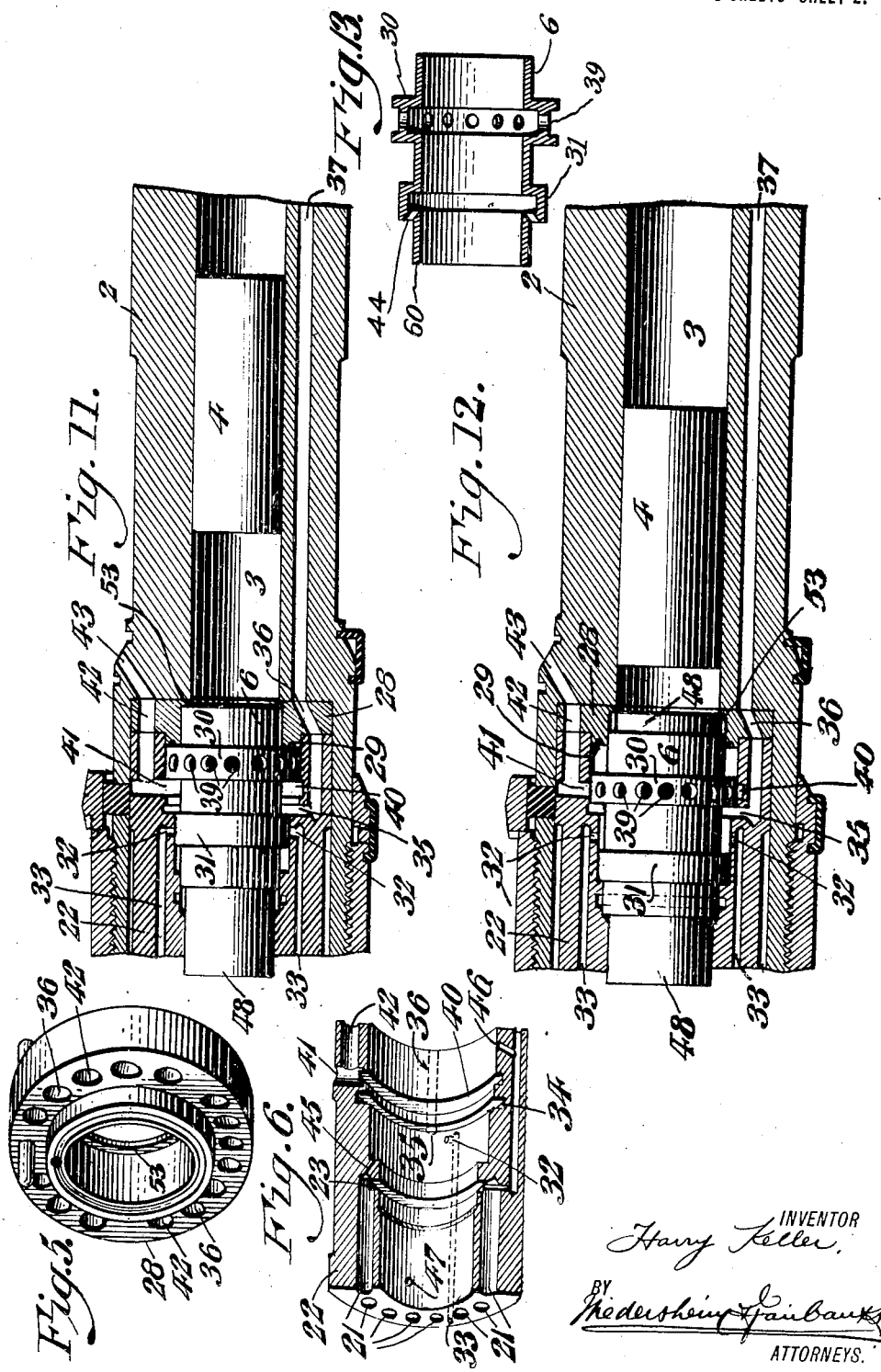

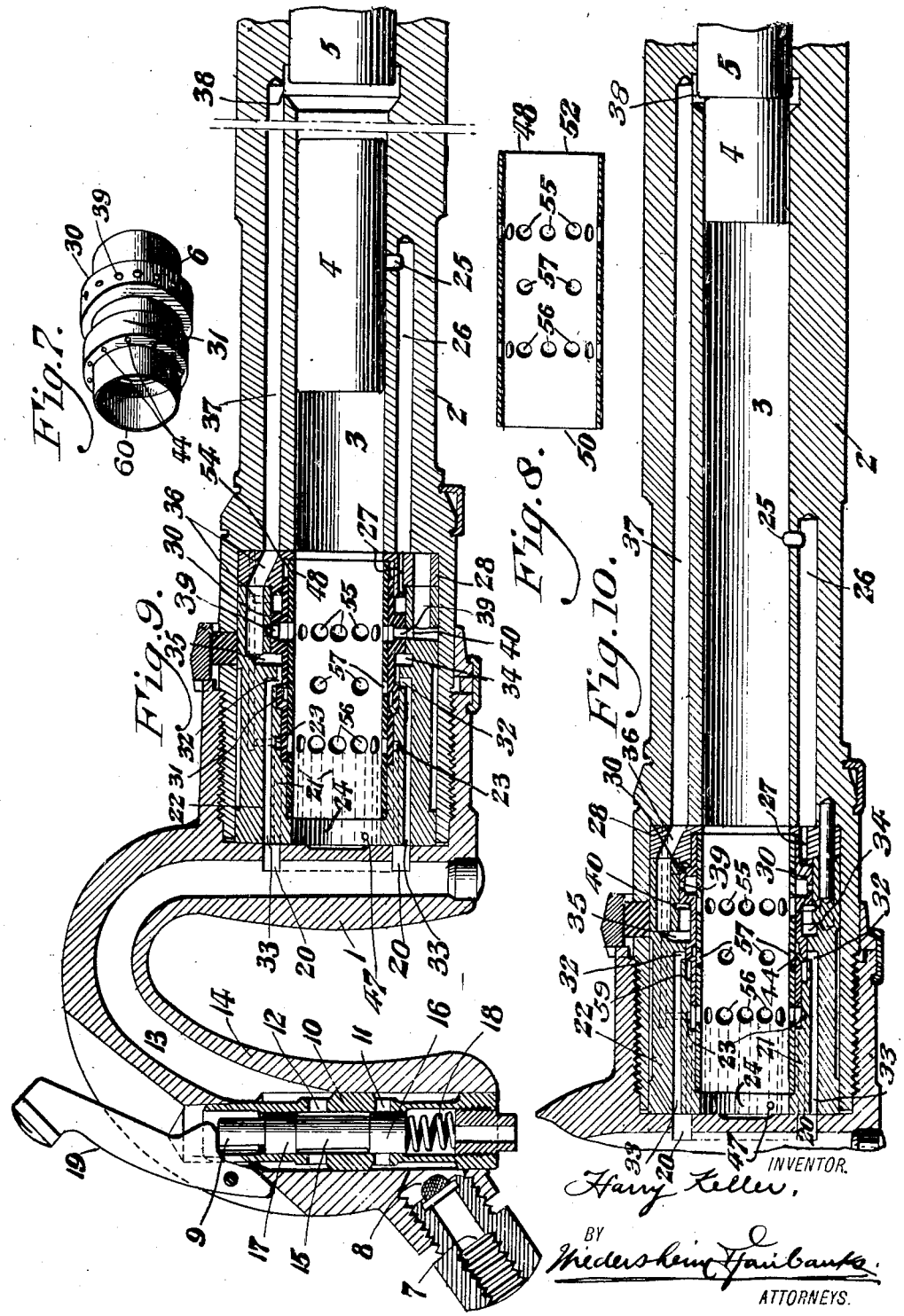

HARRY KELLER, OF CHICAGO, ILLINOIS.

PNEUMATIC-TOOL-VALVE PROTECTOR.

1,354,833.　　　Specification of Letters Patent.　　Patented Oct. 5, 1920.

Application filed December 17, 1919. Serial No. 345,677.

*To all whom it may concern:*

Be it known that I, HARRY KELLER, a citizen of the United States, residing at Chicago, in the county of Cook, State of Illinois, have invented a new and useful Pneumatic-Tool-Valve Protector, of which the following is a specification.

In certain types of pneumatic hammers adapted for riveting, chipping and other analogous purposes, a hollow, sleeve-like distribution valve is employed, in conjunction with an alining reciprocating piston, the latter usually comprising a plain cylindrical bolt of uniform diameter throughout, which ordinarily in its reciprocations passes through said valve, the cycle of operation being such that the reciprocations of said valve and piston are automatically controlled through suitable coacting ports or passages.

It frequently happens, however, that the operators of these pneumatic riveters or "guns" substitute a piston which is shorter than the valve, or shorter than the original piston furnished with the tool, for the purpose of augmenting the velocity or blow of the piston, and in such instances, which in practice occur very frequently in industrial plants where riveting tools of this general character are employed, the piston when shorter than the valve in its rearward stroke toward the valve will therefore instead of passing entirely through the valve, only travel longitudinally into or through a portion of the valve, and in case the valve is worn or its inner bore is out of alinement with the piston chamber or piston, said valve frequently becomes fractured and damaged by the piston striking the same, and, in addition, the piston is prevented from having the free and unobstructed reciprocatory movement, which is absolutely necessary.

By my present invention, I have devised a novel construction of valve protector, comprising an apertured open ended sleeve, which is adapted to be fixedly secured within the valve box in such a manner as to permit the free and unobstructed longitudinal reciprocation or shifting of the valve, the piston, however, never under any circumstances coming in contact with the valve but reciprocating within said valve protector, so that all liability of the valve becoming hit or fractured is entirely obviated.

In carrying out my invention, I employ a thin sleeve whose inner bore is ground to the same diameter as the bore of the riveter cylinder, so that the bore of said sleeve or valve protector forms an accurate alining continuity of the bore of the pneumatic tool cylinder, so that the piston can freely reciprocate into and out of said valve protector, the latter being provided with the necessary ports coacting with the valve and valve box for the purpose of permitting the ingress and egress of the motive fluid to effect the shifting of the valve at the proper periods.

My invention is particularly useful in repair work, as it frequently happens that large industrial plants employing large numbers of these pneumatic riveting tools have at all times a large number of these distribution valves out of commission, which would otherwise be liable to be thrown away and become a total loss, whereas by my invention, it is only necessary to bore or grind the interior of the valve box a little larger and to assemble the valve box and valve with respect to the valve protector, so that said valve protector is interposed between the piston and the valve at all times, whereby a valve box which has become worn can be readily equipped with my invention so as to be used indefinitely.

It further consists of a novel construction of a pneumatic hammer, wherein the distribution valve is equipped with a valve protector embodying my invention, and is shifted in one direction by live air and in the opposite direction by air compressed by the piston during its travel rearwardly or toward said valve.

It further consists of a novel construction of a pneumatic tool, wherein the distribution valve is contained and reciprocates in a chamber formed between the valve protector and the valve box proper, said valve being shifted in one direction by live air and in the opposite direction by air compressed by the piston on its return stroke, and the proper movement of said valve being further assured by the impingement on opposing faces thereof at the proper intervals of live motive fluid.

It further consists of a novel construction of open-ended valve protector, having ports therein alining with the coacting inlet and exhaust ports in the valve box containing the valve.

It further consists of a novel construction and collocation of a valve box, an open-ended valve protector having one end seated in said valve box and its other end seated in a counterbore in the valve box cover or lid, the valve being contained in its chamber formed between said protector and said valve box.

It further consists of a novel construction of a long-stroke riveter, provided with my novel valve protector.

For the purpose of illustrating my invention, I have shown in the accompanying drawing, one form thereof which is at present preferred by me, since the same will give in practice satisfactory and reliable results, although it is to be understood that the various instrumentalities of which this invention consists can be variously arranged and organized and that my invention is not limited to the precise organization of these instrumentalities as herein shown and described.

Figure 1 represents a longitudinal sectional view of a pneumatic tool valve protector embodying my invention, showing also the valve box therefor and the valve contained in its chamber between said protector and valve box, said valve being shown in its forward or right-hand position.

Fig. 2 represents a left-hand end view of Fig. 1.

Fig. 3 represents a right-hand end view of Fig. 1, showing particularly the valve box cover or lid.

Fig. 4 represents a vertical sectional view of my novel valve protector, valve box and valve, the view being taken on a different section line from that seen in Fig. 1.

Fig. 5 represents a perspective view of the valve cover or lid seen at the right of Figs. 1 and 4 and in Fig. 3.

Fig. 6 represents a perspective sectional view of the valve box showing particularly the position of certain air inlet ports which coact with the valve.

Fig. 7 represents a perspective view of the valve.

Fig. 8 represents a longitudinal sectional view of my novel valve protector in detached position.

Figs. 9 and 10 represent longitudinal sectional views of a pneumatic long-stroke riveter, showing my novel valve protector in assembled position, the valve being shown in its rearward position in Fig. 9, and in its forward position in Fig. 10.

Fig. 11 represents a longitudinal sectional view of the riveter cylinder, valve box and certain exhaust ports, the piston, valve protector and valve being shown in elevation and the valve being shown in its forward position.

Fig. 12 represents a view similar to Fig. 11 but showing the valve in its rearmost position. Fig. 13 represents a sectional view of a valve. Fig. 14 represents, in section, another embodiment of my invention in which the valve protector is fitted into the rear end of the cylinder.

Similar numerals of reference indicate corresponding parts.

It will be evident that the broad principle of my invention can be carried out in various types of pneumatic tools, but for convenience of illustration and description, I have elected to show my novel construction of valve protector, as adapted to a long-stroke pneumatic riveter of the construction seen in the Boyer Patent No. 917,242, it being of course apparent that certain changes are required in the valve box, its cover and their adjuncts, to enable a tool of this character to receive my novel valve protector, since it is essential that an annular seat be formed or bored in the valve box to receive the protector, and it is also desirable that the valve cover be counterbored to receive the forward end of the valve protector, the rear end of the latter being seated against a shoulder in said valve box, and it is further essential that the inner bore of the valve protector be of the same diameter and in exact alinement with the bore of the piston chamber in the cylinder, so that the reciprocations of the piston from the piston chamber into and out of the valve protector will be free and unobstructed at all times, and it is further essential that the inlet and exhaust ports of the valve protector accurately aline with the corresponding ports of the valve box, the chamber formed between the valve protector and valve box serving as the valve chamber in which the valve is located and reciprocates.

I will therefore first describe the ordinary cycle of operation of the valve and piston in a tool of this general character, and will then explain the derangements to which a tool unequipped with my invention is liable particularly when a short piston is employed, and how such derangements and accidents are entirely obviated by my invention, and the life of the valve is prolonged indefinitely.

I have shown my invention as especially applicable to a long-stroke riveter, wherein the piston has a length of stroke greater than its own length and in which 1 designates the grasping handle, which is connected to a cylinder 2 having an internal bore or piston chamber 3 adapted to receive a reciprocatory piston 4, which impacts against the shank of a working tool 5, as a rivet set or the like, the admission and the exhaust of motive fluid to effect the reciprocations of the piston 4 being automatically controlled by means of a hollow distribution valve 6. The motive fluid is conducted to a nipple 7 secured in the free end of the grasping handle, so that the inlet 8 is supplied at all times with live motive fluid.

9 designates the throttle valve, which is slidable in a throttle valve bushing 10 located within the handle, said bushing being provided with ports 11 communicating with the inlet 8 and with ports 12 communicating with an air passage 13, which extends through the grasping portion 14 of the handle into the head block or handle sleeve. The throttle valve has an annular groove 15 and the valve heads 16 and 17. A spring 18 presses against one end of the throttle valve to move it toward the throttle valve lever 19, which is pivotally mounted in a slot in the grasping portion of the handle. When the throttle valve lever 19 is pressed forwardly, the live motive fluid is free to pass from the inlet 8 through the ports 11 around the annular groove 15 and through ports 12 into the air passage, 13, which latter communicates with an annular groove 20 in the head block, which is always in free communication with inlet ports 21, which open through the rear end of the valve box or casing 22 and communicate by means of ports 23, see Figs. 1, 6, 9 and 10, with the differential bore 24, which forms a continuation of a bore 3 of the cylinder 2, and contributes with it to form the piston chamber.

It will now be understood that the live motive fluid passes into the chamber formed by the differential bore 24 in rear of the piston 4, and acting thereagainst effects its forward stroke and causes it to impact against the shank of the working tool 5.

As soon as the piston 4 in its forward stroke uncovers the valve shifting port 25, live motive fluid passes from the piston chamber 3 to the port 25 and rearwardly through the passage 26 in the cylinder and through a port 27 in the valve cover or lid 28 and into an annular groove 29 formed in the rear face of such valve cover 28. The live motive fluid impinges against the forward or right-hand face of the valve head 30, and since this face of the head 30 is of greater area than the combined area of the left-hand end of the distribution valve 6 and the rear face of the head 31, a preponderance of pressure is developed, which causes the valve 6 to move from the position seen in Figs. 1, 10 and 11 into that seen in Figs. 4, 9 and 12. This rearward movement of the distribution valve 6 closes the inlet ports 23, and owing to the provision of the annular groove between the heads 30 and 31, the ports 32 will be uncovered, so that live motive fluid can now pass from the annular groove 20 in the handle through the passages 33 and ports 32 into the valve chamber between the heads 30 and 31 to the internal annular groove 34 and through the ports 35 in the valve casing, which communicate with passages 36 extending through the valve casing 22 and its cover 28 and into and through the air passages 37, which extend longitudinally of the cylinder 2 and open into the piston chamber 70 at its forward end through the ports 38. The live motive fluid passing into the piston chamber in advance of the piston 4 through the ports 38, acts against the forward end of the piston and drives it rearwardly or toward the distribution valve 6.

The distribution valve 6 being now shifted to the left or rearwardly, is now in the position seen in Figs. 4, 9 and 12, and the motive fluid in rear of the piston 4 on its rearward stroke exhausts to the atmosphere through the ports 39 in the valve head 30 of the valve 6 into the annular groove 40, thence through ports 41 and passages 42 in the valve casing 22 and its cover 28 and through the outwardly inclined ports 43 in the cylinder, see Figs. 6 and 12. This exhaust of motive fluid in rear of the piston on its return stroke continues until the rear end of the piston 4 covers the ports 39 in the valve 6, whereupon motive fluid is compressed at the rear end of the piston chamber. The pressure created by this compression of the motive fluid causes a preponderance of pressure to be exerted not against the rear end of the distribution valve 6 but against the rear face of the head 31, the latter being due to the presence of the small ports 44 formed in the cylindrical valve 6, see Figs. 4 and 7, so that the compressed motive fluid is free to pass through said ports and impact against the shoulder 59 and the head 31. This causes the distribution valve to shift forwardly from its position seen in Figs. 4, 9 and 12 to that seen in Figs. 1, 10 and 11. This shifting of the distribution valve to its forward position causes the head 31 to cover the ports 32 and such ports are now cut off to prevent admission of motive fluid to the forward end of the cylinder.

During the forward stroke of the piston, the air in the piston chamber 3 in advance of the piston is free to exhaust to the atmosphere through the ports 38, passages 37, passages 36 in the valve casing, ports 35 which open into the annular groove 34 around the valve 6 between the heads 30 and 31 through the annular groove 40, ports 41 and 42 in the valve casing and through the main exhaust ports 43 in the cylinder, which are in register with the ports 42, see Fig. 11.

It will be clear from the foregoing description that the distribution valve 6 is shifted in one direction by live motive fluid and in the opposite direction by motive fluid compressed by the piston.

In order to prevent any improper shifting or fluttering of the distribution valve, one of the passages 21, see Fig. 6, has communicating with it an inclined port 45, whereby the live motive fluid will impinge against the rear face of the valve head 31 in the general direction of the line of travel of said valve. One of the inlet passages 21 for live motive fluid also communicates with a port 46, so that when the valve 6 begins to move rearwardly, its accidental shifting or leakage due to wear is prevented by live motive fluid passing through one of the inlet ports 31, the port 46 and acting against the forward face of the valve head 30. One of the inlet passages 21 for live motive fluid communicates with a small port 47 opening into the valve chamber of the casing 22 a short distance from the inner end of such valve casing, see Figs. 6, 9 and 10, so that live air is constantly admitted through said small port in order to prevent the piston sticking at the handle end of the tool, when the riveter is held in an inverted position.

From the foregoing explanation of the cycle of operation, it will be understood that the piston enters the valve during each of its rearward strokes, and when the tool or the valve and piston are new and accurately fitted, the reciprocal operation of the piston and valve will be free and unobstructed. These moving parts, however, are commonly ground to fit within the thousandth part of an inch and consequently when the valve particularly gets worn interiorly or exteriorly, so as to be slightly out of alinement with the piston and particularly when a short piston is used, as seen at the right-hand portion of Fig. 10, it will be evident that the piston on entering the valve may improperly contact with it in such a way as to fracture or otherwise injure it, in which case the old valve becomes useless and must be discarded for a new valve, and in order to enable a worn valve box to be used indefinitely, I have devised my novel protector 48, best seen in Fig. 8, whose great utility will now be apparent. The valve protector consists of a thin metallic open-ended sleeve, which is seated or fixedly secured in the chamber or bored out recess 49 of the valve box 22 (see Figs. 1 and 4). The rear or left-hand edge 50 of the protector 48 abuts against the shoulder 51 of the valve box, while the forward or right-hand edge 52 of the protector abuts against the wall or counterbore 53 of the valve box cover 28, see Figs. 1, 4 and 5. The valve protector 48 having been accurately and exactly fitted in the valve box 22 and its cover 28, is prevented from longitudinal shifting by the contact of its ends 50 and 52 with the contiguous shoulders or walls 51 and 53 of said box and cover, and the space or chamber between the protector and the valve box constitutes a valve chamber 54 for the valve 6, which can reciprocate freely therein, as will be understood from the enlarged views in Figs. 1 and 4.

The forward row of exhaust ports 55 in the valve protector permit the exhaust of the motive fluid from the rear end of the cylinder when the piston moves rearwardly or toward the valve, to flow through said ports 55 and the ports 39 of the valve and the ports 41 (see Fig. 4) and ports 42 and 43 to the atmosphere (see Fig. 12).

The rear row of valve protector inlet ports 56 (see Figs. 1, 4, 9 and 10) permit the inlet of the motive fluid which enters ports 21 and 23 to drive the piston forwardly, while the intermediate row of ports 57 permits the air compressed by the piston on its return stroke to pass into the valve ports 44 (see Fig. 4) the valve 6 being shifted by the rearward movement of the piston from the position seen in Fig. 4 to its forward position seen in Fig. 1; in other words, there is a period when the piston is moving rearwardly that the valve 6 is shifted forwardly by air compressed by the piston entering the ports 57 and 44.

It will thus be seen that my novel valve protector is equipped with a rearward series of inlet ports, a forward series of exhaust ports, and an intermediate series of valve shifting ports, and as I am the first in the art to devise a device of this character, my claims to these features are to be interpreted with the scope accorded to inventions of this character.

It will be evident to those skilled in the art, that in order to repair a tool of the general character above described or to equip the same with my novel protector, it is only necessary to bore the valve box and valve cover so as to enable the valve protector to be snugly fitted therein, after which it is only necessary to enlarge the hole through the worn valve so that the latter will slide freely and accurately upon the valve protector when the parts are assembled as seen in Figs. 1 and 4.

I have found that the piston of a pneumatic riveter equipped with my novel device will strike a somewhat faster and harder blow than a tool wherein the protector is not used, and I have also found that the shifting of the valve is more positively and accurately effected by reason of the fact that at the proper periods the air compressed by the piston on its return stroke toward the valve, is more effectively and positively directed through ports 57 and 44 against the shoulder 59 and the proper area of the valve to shift the latter forwardly at the proper periods.

I am therefore enabled by my invention not only quickly and expeditiously to repair a pneumatic riveter wherein the valve is worn, but I am also enabled to produce in a repaired tool by equipping it with my invention, a riveter which is even superior to the original tool.

It will be apparent from the foregoing that the valve in tools of this character when my novel protector is assembled with respect to the valve, valve box and cover, as already described, never comes in contact with the piston, but that the latter always reciprocates on its return stroke within the bore of the valve protector, so that the free movement of the valve is never interfered with by the movement of the piston, nor can the valve ever become damaged by the piston striking it. The ports 57 are always in communication with the groove 58 of the valve, and are always in communication with the ports 44 of the valve, thereby allowing more or less continuous pressure to be exerted against the shoulder 59 to hold the valve in its forward position until the piston has finished its forward stroke, when the proper ports are opened by the piston to allow air to impinge against the large pressure area of the valve, thereby forcing the valve to its rearward position seen in Fig. 4.

I am also the first in the art to devise a valve protector of the character described having the valve shifting ports 57 therein, which are always in communication with the ports 44 of the valve for the purpose above explained, and my claims to these features also are to be interpreted in accordance with the scope given to inventions of this character.

It will be understood from the foregoing that the port 25 for the fluid control of the valve opens into the cylinder at a greater distance from either end of the cylinder than the length of the piston, whereby the proper control of the valve is effected, the piston having a stroke considerably in excess of its own length, and I am thereby enabled to strike a very powerful and heavy blow directly upon the shank of the button set or other working tool, and by constructing the piston of a plain cylindrical shape without any groove or ports therein, the same is rendered exceedingly durable and can be very cheaply manufactured.

By the provision of my novel protector 48, and the collocation of its valve shifting ports 57 with respect to the annular internal valve chamber 58, which is always in communication with said ports 57 in either extreme position of the differential distribution valve 6 (as will be understood from Figs. 1 and 4), it will be apparent that always at the proper instant when the air compressed by the returning piston is compressed to the requisite degree, pressure will be exerted through the ports 57, chamber 58 and ports 44 against the shoulder or wall 59, so as to instantaneously shift the differential valve 6 from the position seen in Fig. 4 to its forward position seen in Fig. 1, and in this respect, my novel valve mechanism differs from that of the Boyer Patent No. 917,242, aforesaid, since in that device, it is essential that a certain amount of pressure be exerted on the rear extremity of the valve, at 60, see Fig. 7, whereas in my device the valve is shifted forward solely by the pressure exerted through the ports 57 of the valve protector 48, the pressure being relieved from the forward face of the valve through the ports 27, 26 and 25 at this period. I make no claim broadly to the feature of a differential or other valve shifted in one direction by live air pressure and in the opposite direction by air compressed by the returning piston, since this is a common right in this art by reason of the British patent to Lake, No. 2182 of 1875, U. S. patents to Von Buhler, No. 510,155, and Uren, No. 303,344, nor do I claim *per se* the use of the ports 45 or 46, see Fig. 6, to prevent fluttering of the valve, since it also is a common right to employ an auxiliary port discharging air against a valve, and I only claim these features in combination with my novel valve protector, whereby a novel structure is produced which adds greatly to the efficiency of the riveters of this type.

It will be apparent from the foregoing that the valve protector can be formed as an integral part of the cylinder or it can be fitted into the cylinder, as seen in Fig. 14, or it may be disposed within the valve box, as seen in other figures of the drawings, and all of these forms are within the spirit and scope of the invention.

It will now be apparent that I have devised a novel and useful pneumatic tool valve protector, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. As a new article of manufacture, a valve protector, comprising a thin open-ended sleeve having ports therein, the rear of said ports serving as inlet ports, the forward ports serving as exhaust ports and the intermediate ports serving as valve shifting ports.

2. As a new article of manufacture, a valve protector, comprising a thin open-ended sleeve having its inner bore adapted to receive a reciprocating piston, and its outer surface to serve as a bearing for a hollow cylindrical valve, said protector having three rows of ports therein, the forward ports serving as exhaust ports, the rear ports serving as inlet ports, and the intermediate ports serving as valve shifting ports.

3. The combination of a hollow cylindrical valve, and a valve protector comprising an open-ended sleeve upon which said valve is fitted, and coacting ports in said valve and protector, the rear ports serving as inlet ports, the forward ports serving as exhaust ports, and the intermediate ports serving as valve shifting ports.

4. The combination of a hollow cylindrical valve, having a series of exhaust ports and a series of valve shifting ports therein, and a valve protector comprising a thin open-ended sleeve upon which said valve is fitted and reciprocates, said protector having a series of exhaust ports, and valve shifting ports therein coacting with the corresponding ports of said valve.

5. The combination of a piston chamber, a cylindrical valve protector having its inner bore in alinement with the bore of said piston chamber, a piston reciprocating in said piston chamber and valve protector, a hollow valve fitted and reciprocating upon said valve protector, and coacting series of ports common to said valve and valve protector, one series of ports serving to admit motive fluid, another series serving to exhaust motive fluid, and another series serving as valve shifting ports.

6. In a pneumatic tool, a valve protector comprising a thin open-ended sleeve, a valve box in which said sleeve is fixedly secured, and a valve cover for said valve having a counterbore therein, one end of said sleeve being seated in said counterbore and the other end of said sleeve being seated in said valve box, said protector having ports in the walls thereof alining with inlet and exhaust ports in said valve box, and other ports alining with the ports in the valve box for receiving compressed fluid for shifting said valve.

7. In a penumatic tool, a cylinder having a piston chamber therein, a valve box, a valve cover therefor, and a valve protector carried by said box and cover and comprising a thin open-ended sleeve of the same internal diameter as said piston chamber, one end of said valve protector being seated in said valve box and the other end being seated in a counterbore of said valve cover, said valve protector having inlet and exhaust ports alining with the inlet and exhaust ports in said valve box, and also having other ports alining with coacting ports in the valve box for admitting fluid compressed by said piston and thus shifting said valve.

8. A pneumatic hammer comprising a cylinder having a piston chamber, a piston therein, ports for the admission and exhaust of air, a valve for controlling the admission and exhaust of air, a duct leading from the air suppy duct and opening toward said valve to cause the air to impinge against the valve in the general direction of its line of motion, and a valve protector comprising a thin sleeve interposed between the piston and valve and of greater length than said valve and upon which said valve is fitted and reciprocates, the inner bore of said sleeve being the same diameter as the bore of said piston chamber and in alinement therewith.

9. A pneumatic hammer comprising a cylinder having a piston chamber, a piston therein, ports for the admision and exhaust of air, a valve for controlling the admission and exhaust of air, a plurality of ducts leading from the air supply duct and opening in position and direction to cause the air to impinge against opposite walls of said valve in the general direction of its line of motion, and a valve protector comprising a thin sleeve interposed between the piston and valve and of greater length than said valve and upon which said valve reciprocates, the inner bore of said valve protector being of the same diameter as the bore of said piston chamber and forming a continuity thereof.

10. A pneumatic hammer, comprising a sleeve having a piston chamber, a piston therein, ports for the admission and exhaust of air, a valve for controlling the admission and exhaust of air, said valve being moved in one direction by air compressed by the piston and in the opposite direction by the motive fluid, a duct leading from the air supply duct and opening in position and direction to cause the air to impinge against said valve in the general direction of its line of motion, and a valve protector of greater length than said valve and on which said valve reciprocates, said protector being interposed between the valve and piston and comprising a thin sleeve located in alinement with the bore of said piston chamber, the inner diameter of said protector being of the same diameter as the bore of said piston chamber and forming a continuity thereof.

11. In a pneumatic tool, a cylinder having a piston chamber, a piston in said piston chamber, a valve to control admission and exhaust to and from said cylinder, said valve being actuated by direct air pressure at one stroke of the piston and by compression of air between it and the piston at the return stroke, ducts leading from the air supply duct and opening in position and direction to cause air to impinge against opposing surfaces of the valve in the general direction of its line of motion, a valve box for said valve, and a valve protector seated in said valve box and interposed between the valve and piston, said valve reciprocating in a chamber formed between said protector and valve box, the inner diameter of the bore of said valve protector being of the same diameter as the bore of said piston chamber and forming a continuity thereof.

12. In a pneumatic hammer, a cylindrical distribution valve having differential pressure areas and located at the rear end of the piston chamber, a valve protector on which said valve is fitted and reciprocates, said protector having a series of ports therein serving as exhaust ports, a rear series of ports serving as inlet ports, and an intermediate series of ports serving as valve shifting ports and being in position to have the piston enter it at the end of its rearward stroke, a live air groove alternately opened and closed by the rear end of said valve to admit the motive fluid to the interior of the valve and its smaller pressure area, and the rear end of the piston chamber, and cut it off therefrom, and a passage communicating at its rear end with the larger pressure area of the valve and opening at its forward end into the piston chamber by a port uncovered by the piston during the forward stroke of the latter, and a piston reciprocating in the piston chamber and valve protector and operating as it approaches the end of its rearward stroke to shift the valve in one direction by air compressed in front of the piston and acting upon a smaller pressure area of the valve, and operating at its forward stroke to shift the valve in the opposite direction by motive fluid admitted to the larger pressure area of the valve through a port and passage uncovered by the piston.

13. In a pneumatic hammer, a cylindrical distribution valve having differential pressure areas and located at the rear end of the piston chamber, a valve protector on which said valve is fitted and reciprocates, said protector having a series of ports therein serving as exhaust ports, a rear series of ports serving as inlet ports, and an intermediate series of ports serving as valve shifting ports and being in position to have the piston enter it at the end of its rearward stroke, a live air groove alternately opened and closed by the rear end of said valve, to admit the motive fluid to the interior of the valve and its smaller pressure area, and the rear end of the piston chamber, and cut it off therefrom, a passage communicating at its rear end with the larger pressure area of the valve and opening at its forward end into the piston chamber by a port uncovered by the piston during its forward stroke, and a piston reciprocating in the piston chamber and valve protector and operating as it approaches the end of its rearward stroke to shift the valve in one direction by air compressed in front of the piston and acting upon a smaller pressure area of the valve, and operating at its forward stroke to shift the valve in the opposite direction by motive fluid admitted to the larger pressure area of the valve through a port and passage uncovered by the piston.

14. The combination of a valve box, a hollow valve therein having a chamber 58 and ports 44 leading thereto, a valve protector fixedly secured in said valve box and upon which said valve is fitted and reciprocates, said protector having valve shifting ports 57 always in communication with said ports 44, a piston and other ports and passages common to said piston and valve for effecting the reciprocations thereof.

15. In a pneumatic tool, a cylinder, a hammering piston whose largest diameter and major portion comprises one unbroken surface, a valve having a series of inlet, exhaust and valve shifting ports located wholly at one end of said cylinder and exterior thereto for controlling the inlet of the motive fluid to opposite ends of the piston chamber to reciprocate the piston, and a valve protector interposed between said piston and valve, the latter being fitted to and reciprocating upon said protector, said valve protector having series of inlet, exhaust and valve shifting ports, coacting with the corresponding inlet, exhaust, and valve shifting ports in said valve.

HARRY KELLER

Witnesses:
    DONALD DESPAIN,
    CY SMITH.